United States Patent [19]

Drake et al.

[11] 4,303,926
[45] Dec. 1, 1981

[54] CHART DRIVE MECHANISM

[76] Inventors: Charles F. Drake, 3245 Woodrow, Port Arthur, Tex. 77640; Charles A. Rooth, Rte. 4 Box 76, Alvin, Tex. 77511

[21] Appl. No.: 115,429

[22] Filed: Jan. 25, 1980

[51] Int. Cl.³ .................... G01D 9/00; G01D 15/16; G01D 15/26
[52] U.S. Cl. .................... 346/68; 346/33 P; 346/124; 346/137
[58] Field of Search .................... 346/33 R, 33 P, 124, 346/137, 68

[56] References Cited

U.S. PATENT DOCUMENTS

| | | | |
|---|---|---|---|
| 796,620 | 8/1905 | Wylie | 346/124 X |
| 1,826,272 | 10/1931 | Chrisman | 346/137 X |
| 2,926,059 | 2/1960 | Squier | 346/137 |
| 2,978,287 | 4/1961 | Daugherty | 346/137 |
| 3,064,267 | 11/1962 | Maeder | 346/137 |
| 3,103,402 | 9/1963 | Stoops | 346/68 |
| 3,109,694 | 11/1963 | Mullins et al. | 346/137 |
| 3,196,452 | 7/1965 | Mullins et al. | 346/137 |
| 3,258,778 | 6/1966 | Hardie | 346/137 |

*Primary Examiner*—George H. Miller, Jr.
*Attorney, Agent, or Firm*—Gunn, Lee & Jackson

[57] ABSTRACT

In the preferred and illustrated embodiment of a recording device, a fluid volume driven chart bracket is disclosed. The bracket is rotationally responsive to fluid flow through a pipeline or the like. A recording chart is rotated by the fluid flowing through the pipeline via a volume driven gear train and the chart bracket. An automatic chart changer clock is mounted to the bracket to periodically change the recording chart. The variables recorded by the device are weighted proportionally to the volume of fluid flowing through the pipeline.

4 Claims, 4 Drawing Figures 4,303,926

CHART DRIVE MECHANISM

BACKGROUND OF THE DISCLOSURE

This invention relates to recording devices and more particularly to a chart bracket for recording devices.

Recording instruments, such as flowmeters, pressure recording instruments, temperature indicators and the like, using circular disk paper charts upon which a pen records variations in value of a variable being monitored have been in common use for many years. The charts used may serve to record variations of the variables during varying periods of time, such as 8-hour periods, 12-hour or 24-hour periods, or 7-day periods or the like. In the past, the charts were manually changed at the required interval of time. More recently, chart changing instruments have been developed to automatically change the circular disk charts at predetermined intervals of time. The recorded charts are stored by the chart changer until collected by an operator.

There is presently a need, particularly in the oil and gas industry, for an automatic chart changer which will change the chart from a volume driven record gauge commonly used on gas meters. Such a chart should be easily scanned with modern scanners and should offer better resolution by allowing the monitored variables to be recorded as a function of fluid volume flow. The increasing use of very high volume turbine meters has prompted dissatisfaction with the old averaging method of applying temperature and pressure factors. A small error in applying a factor in the averaging method results in large volume errors and, therefore, errors in billing.

BRIEF SUMMARY OF THE DISCLOSURE

This invention is directed to an improvement for a volume driven recording device comprising a bracket interconnected with the volume driven shaft of the recording device and a chart changing clock. The bracket comprises two generally U-shaped arms connected to a tee coupling. The bracket also includes thumb screw adjustments providing adjustment in all directions for concentric alignment of recording charts on the volume dependent gear box output shaft.

It is, therefore, an object of this invention to provide a recording device responsive solely to fluid flow, yet capable of automatically changing a recording chart at predetermined intervals of time, as, for example, every twenty-four hours. This is accomplished by a feature of the invention providing a bracket interconnected to a volume driven shaft and an automatic chart changing clock. The clock rotates freely within the bracket 360.0 degrees each twenty-four hours. The sole function of the clock is to change the recording chart at the predetermined time interval. The recording chart is rotated by the bracket rotatably responsive to fluid flow through a pipeline or the like. Thus, the monitored variables, such as pressure and temperature, are recorded on the recording chart as affected by the volume of fluid flow.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
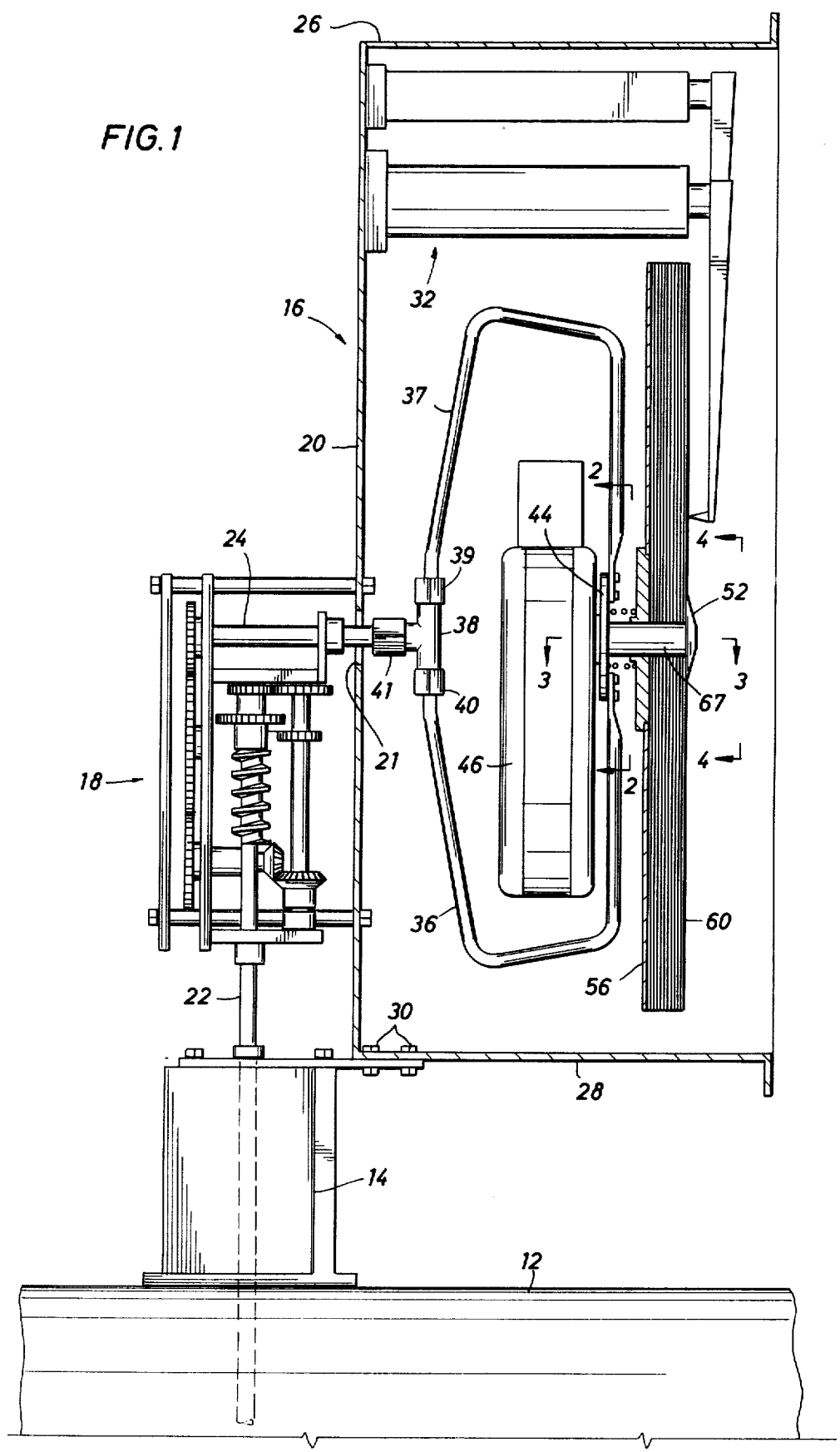
FIG. 1 is a cross-sectional side view of a recording device employing the bracket of the invention.

Referring to FIG. 1, a volume driven PVTT (pressure, volume, temperature, time) recorder is shown modified to include the fluid driven bracket of the invention. The recorder is mounted onto a conduit 12 to monitor the fluid flow therethrough. The fluid may be liquid or gas. A volume meter 14 is interconnected between the conduit 12 and the recorder case 16. The meter 14 is a standard volume dial index. A volume driven gear train 18 is mounted to a back wall 20 of the recorder case 16. The gear train 18 includes a basic gear reduction box well known in the art. A drive shaft 22 extends into the gear train 18 through the volume meter 14 from the fluid stream in the conduit 12. The fluid flow in the conduit 12 rotates the drive shaft 22 which, in turn, rotates the driven or output shaft 24 via the gear train 18. The apparatus uses a turbine in the pipeline to rotate the drive shaft. The turbine pressure seals, packing glands and cooperative apparatus are omitted for sake of clarity in focusing attention on the inventive volume based recorder disclosed herein.

The recorder case 16 is a box-like structure including a top wall 26, a bottom wall 28 and the back wall 20. The recorder case 16 also includes a chart catcher and a door likewise omitted to focus on the volume dependent chart recorder. The recorder case 16 is secured to the volume meter 14 by bolts 30 extending through the bottom wall 28 as shown in FIG. 1. The back wall 20 includes a hole 21 for receiving the driven shaft 24 therethrough. A pen arm support assembly 32 is mounted adjacent the top wall 26 on the back wall 20 inside the recorder case 16. The pen arm assembly 32 is of the standard type and may include a standard beta type pen for recording variations in the variables being monitored on the recording chart.

The bracket of the invention installed in FIG. 1 comprises two generally U-shaped arms 36 and 37 and a tee coupling 38. The bracket arms 36 and 37 are connected to the tee coupling by nuts 39 and 40. The tee coupling is, in turn, connected to the output shaft 24 by the nut 41. The output shaft 24 protrudes into the recorder case 16 through the hole 21 a sufficient distance to enable one to easily connect the tee coupling 38 to the output shaft 24 employing available hand tools. The output shaft 24, the bracket arms 36 and 37 and the tee coupling 38 may be manufactured of lightweight material such as hollow metal tubes or the like. The nuts 39, 40 and 41 are fasteners commonly used for connecting tubes together.

Figure 2:
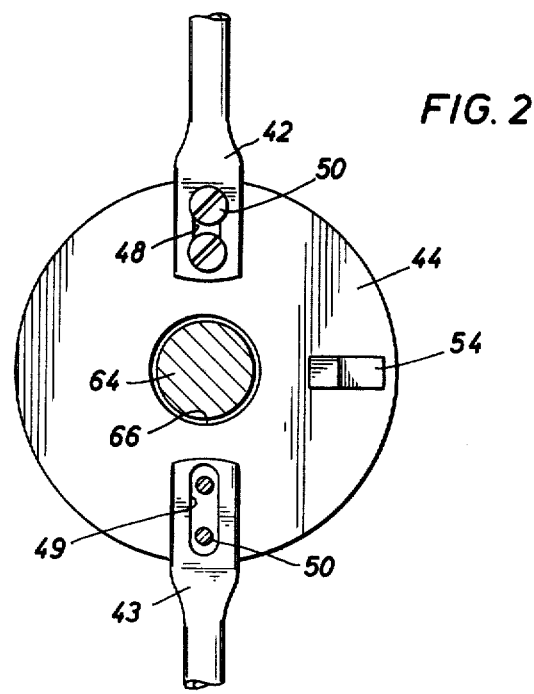
FIG. 2 is a fragmentary front view of the bracket mounted on a clock front plate.
Figure 3:
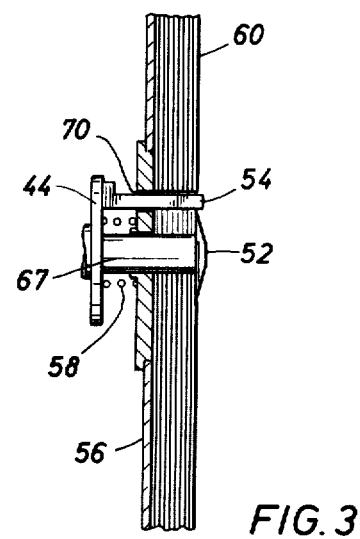
FIG. 3 is a fragmentary sectional view of a plurality of recording charts mounted on a central chart mounting structure.
Figure 4:
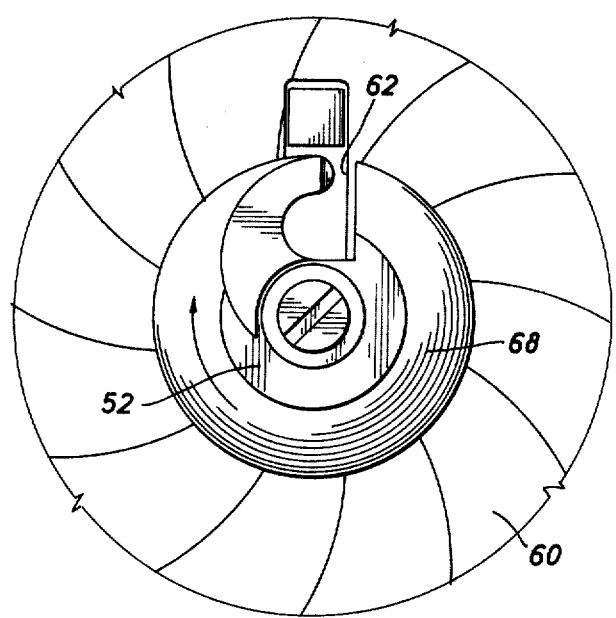
FIG. 4 is an enlarged front view of a driving pin and a discharge button which overlies the recording charts.

The bracket arms 36 and 37 include flat ends 42 and 43 shown in FIG. 2 which mount to a front plate 44 of an automatic chart changer clock 46. The chart changer clock 46 is of a type well known in the art exemplified by a Mullins Dial-O-Graph Automatic Chart Changer. Since the clock 46 is well known in the art, it is not shown in great detail in the drawings. However, the chart changer clock 46 is shown in FIGS. 1 and 3 as including a front plate 44, a release button 52, an alignment pin 54, a chart plate 56 and a spring 58. The only purpose of the clock 46 in the invention is timely operation of the chart release button 52 at predetermined time intervals. The operation of the chart changer clock 46 is well known as described in U.S. Pat. No. 3,196,452 to O. E. Mullins, et al, July 20, 1965. Briefly, at predetermined time intervals, such as each twenty-four hours, the clock 46 activates the release button 52 to discharge a single chart 60. The release button 52 includes a shaft 64 which is drivingly engageable with the clock 46. The shaft 64 extends through a hole 66 of the plate 44 and through a "hollow" support shaft 67 extending from the plate 44 concentric to the hole 66. The shaft 64 is freely rotatable therein. The hollow shaft 67 is affixed to the plate 44 by welding, brazing or the like. The chart plate 56, the spring 58 and the charts 60 are mounted on the hollow shaft 67 as shown in FIG. 3. At the predetermined time, the release button 52 is quickly revolved by the clock 46 to discharge the outermost recording chart 60 as disclosed in the aforementioned Mullins patent. The rectangular pin 54 extends from the front plate 44 of the clock 46 through a slotted aperture 62 of the charts 60 for aligning a stack of recording charts as shown in FIG. 3. The chart release button supports a curved knife having a bent outer tip (see FIG. 4) which hooks into the seat in the stack of charts, penetrating into the stack to cut loose the top chart and drop the top chart of the stack. The curved knife rotates one full turn in about one second and returns to its initial position.

Ordinarily the chart changer clock is attached to the back of a recorder case and the chart plate or hub rotates 360° within the recorder case during a twenty-four hour period. The release button operates once each twenty-four hour period to release the top chart. In the instant application, however, the chart changer clock plate 44 is firmly secured to the output shaft 24 via the bracket arms 36 and 37. The clock is permitted to rotate freely within the disclosed bracket. The clock is the timing mechanism for actuating the release button on a predetermined schedule and has no influence on chart rotation.

The ends 42 and 43 of the bracket arms 36 and 37 include elongate slots 48 and 49 for receiving adjustment screws 50 therethrough. The screws 50 threadably secure the bracket arms 36 and 37 to the front plate 44 of the chart changer clock 46 and permit adjustments to be made so that the plate 44 is positioned substantially perpendicular to the longitudinal axis of the output shaft 24 as shown in FIG. 1. It will be observed then, that the support shaft 67 which is affixed to and extends perpendicularly from the surface of the plate 44 is in substantial alignment with the output shaft 24. It is preferred that the support shaft 67 be in axial alignment with the output shaft 24, as best shown in FIG. 1, to insure concentricity of pen marking on the charts 60. The charts 60 are supported and centered on the support shaft 67 and lie in a plane substantially perpendicular to the longitudinal axis of the support shaft 67 and the output shaft 24. Thus, the output shaft 24, the support shaft 67 and the charts 60 have a common rotational axis insuring concentricity of pen marking on the charts 60.

A small reference indicator (not shown) may be provided to accurately check the chart kickoff time. The reference indicator may be mounted on the clock 46 directly under the front plate 44. The reference indicator shows twenty-four hours divided into 15-minute increments. The alignment pin 54 is positioned at a point relative to the reference indicator to set the kickoff time.

In the operation of the recording device, the charts 60 are rotated counterclockwise by fluid flowing through the conduit 12 via the gear box of the invention. The gear box is of a standard type found in industry accepted volume driven recorders. Rotation is imparted to the charts 60 by the plate 44 which is, in turn, secured to the bracket arms 36 and 37 which are rotated by output shaft 24. The plate 44 is joined to the clock and to the alignment pin 54 extending through the slot 70 in the chart plate 56 so that rotation of the bracket is immediately transmitted to the chart plate 56 and, thus, to the charts 60. The clock 46 rotates clockwise within the bracket, but does not affect rotation of the recording charts 60. The recording charts 60 are rotated solely proportionately to fluid flow. The chart rotation, being proportionate to fluid volumetric flow, establishes a base line for recorded data. In this invention, the recording device provides a record of pressure, temperature or other monitored variables proportional to fluid volume flow. A volume dependent gear train ratio is selected which will produce about ninety percent (90%) chart rotation under maximum flow conditions, thus improving variable resolution of the monitored variables. One particularly useful result is obtaining time expanded variable recordation proportionate to volume. At times of high flow rate, the arc of a variable is expanded to increase data resolution and to reduce the impact of errors.

While the foregoing is directed to the preferred embodiment of the present invention, other and further embodiments of the invention may be devised without departing from the basic concept thereof, and the scope thereof is determined by the claims which follow.

We claim:

1. For use with a recording device cooperative with a fluid driven output shaft, a chart mounting plate supporting a plurality of recording charts and means for periodically removing the top chart, bracket means connecting the ouptut shaft and the mounting plate for rotating the chart supported by the plate at an angular rate proportionate to fluid volume flow, said bracket means comprising:
    (a) a coupling;
    (b) a pair of shaped arms adapted to extend around and connect from said coupling to the mounting plate; and
    (c) adjustment means for concentrically aligning the recording charts relative to an axis for rotation.
2. The apparatus of claim 1 wherein:
    (a) one end of said arms is flat;
    (b) said one end includes an elongate slot for receiving said adjustment means therethrough; and
    (c) said adjustment means comprises a plurality of screws threadably securing said one end of said arms to said mounting plate.
3. The apparatus of claim 1 wherein the recording charts are rotated solely by said output shaft proportionate to the fluid volume flow rate.
4. The apparatus of claim 3 including a chart changer clock periodically removing the topmost chart at a predetermined time and wherein said chart changer clock is mounted such that its operation does not rotate the charts for data recordation.

* * * * *